United States Patent
Giles et al.

(10) Patent No.: US 7,987,497 B1
(45) Date of Patent: Jul. 26, 2011

(54) SYSTEMS AND METHODS FOR DATA ENCRYPTION USING PLUGINS WITHIN VIRTUAL SYSTEMS AND SUBSYSTEMS

(75) Inventors: Aaron Giles, Issaquah, WA (US); Eric P. Traut, Bellevue, WA (US); Rene Antonio Vega, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 772 days.

(21) Appl. No.: 10/794,898

(22) Filed: Mar. 5, 2004

(51) Int. Cl.
G06F 7/04 (2006.01)
G06F 17/30 (2006.01)
G06F 11/30 (2006.01)
G06F 12/14 (2006.01)
G06F 13/00 (2006.01)
G06F 13/28 (2006.01)
H04N 7/16 (2011.01)
H04L 29/06 (2006.01)
B41K 3/38 (2006.01)

(52) U.S. Cl. .............. 726/2; 726/27; 713/164; 713/193; 380/59; 711/163

(58) Field of Classification Search .................. 713/200; 726/2, 16, 26, 27
See application file for complete search history.

(56) References Cited

U.S. PATENT DOCUMENTS

| | | | | |
|---|---|---|---|---|
| 4,780,905 A * | 10/1988 | Cruts et al. | .................... | 380/44 |
| 5,231,662 A * | 7/1993 | van Rumpt et al. | ........... | 713/193 |
| 5,343,525 A * | 8/1994 | Hung et al. | .................... | 713/193 |
| 5,513,262 A * | 4/1996 | van Rumpt et al. | ............. | 380/29 |
| 5,893,084 A | 4/1999 | Morgan et al. | .................. | 706/50 |
| 6,178,504 B1 | 1/2001 | Fieres et al. | .................. | 713/164 |
| 6,199,163 B1 * | 3/2001 | Dumas et al. | .................. | 713/183 |
| 6,973,576 B2 * | 12/2005 | Giobbi | .......................... | 713/193 |
| 7,146,507 B2 * | 12/2006 | Shindo et al. | ................. | 713/189 |
| 7,260,820 B1 * | 8/2007 | Waldspurger et al. | ........... | 718/1 |
| 7,428,636 B1 * | 9/2008 | Waldspurger et al. | ........ | 713/164 |
| 2002/0069369 A1 * | 6/2002 | Tremain | ........................ | 713/201 |
| 2002/0169987 A1 * | 11/2002 | Meushaw et al. | ............. | 713/201 |

(Continued)

FOREIGN PATENT DOCUMENTS

WO   WO 01/65366   9/2001

OTHER PUBLICATIONS

ScramDisk v2.02H User Manual, S. Simpson et al., Apr. 1, 1999.*

(Continued)

*Primary Examiner* — Nasser Moazzami
*Assistant Examiner* — Oscar A Louie
(74) *Attorney, Agent, or Firm* — Woodcock Washburn LLP

(57) ABSTRACT

Several embodiments of the present invention provide a means for improving data access security in computer systems to support high-security applications, and certain of these embodiments are specifically directed to providing sector-level encryption of a virtual hard disk in a virtual machine environment. More specifically, certain embodiments are directed to providing sector-level encryption by using plug-ins in a virtual machine environment, thereby providing improved data access security in a computer system that supports high-security applications. Certain embodiments also use encryption plug-ins associated with standard encryption software for exchanging data between a virtual machine (VM) and its associated virtual hard drive(s) (VHDs). Moreover, several embodiments of the present invention are directed to the use of plug-in encryption services that interface with, and provide services for, a VM via a VM Encryption API (or its equivalent).

22 Claims, 7 Drawing Sheets

U.S. PATENT DOCUMENTS

2003/0056054 A1  3/2003  Levy et al. ............... 711/6
2003/0065925 A1*  4/2003  Shindo et al. ............ 713/178
2004/0098597 A1*  5/2004  Giobbi .................... 713/185

OTHER PUBLICATIONS

"Secure Virtual Private Network: The Future of Data Communications," Herscovitz, vol. 9, Issue 4, pp. 213-220, John Wiley & Sons, Inc. New York, NY, USA, 1999.*

VMware Workstation User's Manual Version 3.2, VMware Inc. 1998-2002.*

DriveCrypt Plus Pack, SecurStar Computer Security, 2002.*

"DriveCrypt Plus Pack," SecurStar Computer Security, Sep. 2002 (via Wayback Machine).*

"Virtualizing I/O Devices on VMware Workstation's Hosted Virtual Machine Monitor," Sugerman et al., VMware Inc., Proceedings of the 2001 USENIX Annual Technical Conference, USENIX Association, Boston, Massachusetts, USA, Jun. 25-30, 2001.*

"StegFS: A Steganographic File System for Linux," McDonald et al., Lecture Notes in Computer Science, Springer Berlin / Heidelberg, vol. 1768/2000, Information Hiding, 2000.*

"Mercy: A Fast Large Block Cipher for Disk Sector Encryption," Crowley, Lecture Notes in Computer Science, Springer Berlin / Heidelberg, vol. 1978/2001, Fast Software Encryption, 2001.*

Microsoft Windows 2000 Server White Paper, "Encrypting File System for Windows 2000," 1998, 1-28.

* cited by examiner

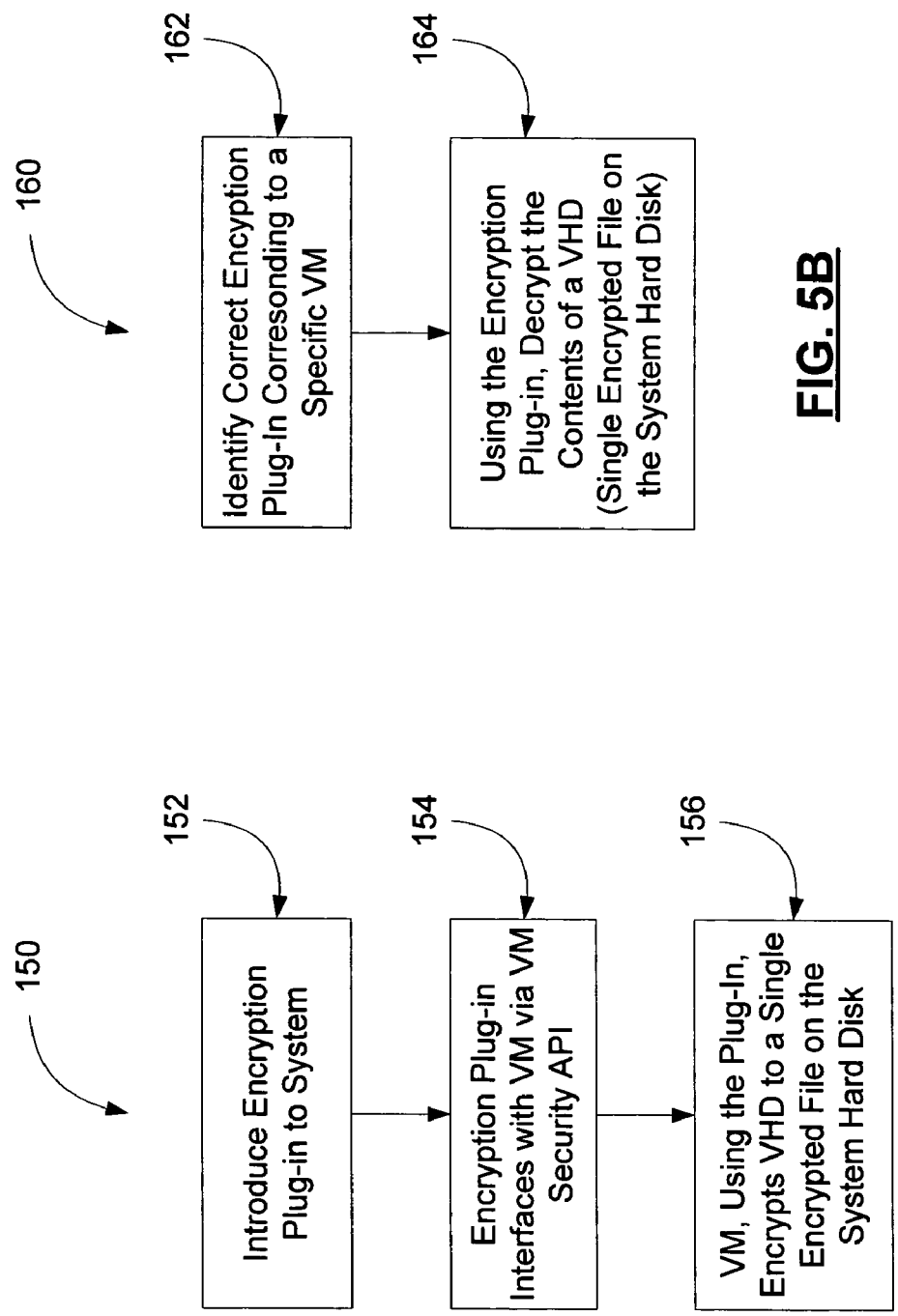

SYSTEMS AND METHODS FOR DATA ENCRYPTION USING PLUGINS WITHIN VIRTUAL SYSTEMS AND SUBSYSTEMS

FIELD OF THE INVENTION

The present invention generally relates to the field of virtual machines (also known as "processor virtualization") and software that executes in a virtual machine environment. More specifically, the present invention is directed to providing data encryption, including sector-level encryption for virtual hard drives, within a virtual machine environment.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software designed for its own hardware architecture and software written for computers having an unrelated hardware architecture. As a more specific example, a computer system manufactured by Apple Computer, for example, may run operating systems and application programs written for PC-based computer systems. It may also be possible to use an emulator program to operate concurrently on a single CPU multiple (and possibly different or incompatible) operating systems. In this arrangement, although each operating system is distinct from the others, an emulator program can host one of the two operating systems, allowing the otherwise incompatible operating systems to run concurrently on the same computer system.

When a guest computer system is emulated on a host computer system, the guest computer system is said to be a virtual machine, as the guest computer system exists only as a software representation in the host operating system of the hardware architecture corresponding to the guest computer system. The terms emulator, virtual machine, and processor emulation are sometimes used interchangeably to denote the ability to mimic or emulate the hardware architecture of an entire computer system. As an example, the Microsoft Corporation's Virtual PC software emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment might also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

Data security is important for maintaining a secure computing environment. If access to the data in data files is not restricted and controlled, a myriad of threats to that data are possible—for example, the data content may be intercepted or modified. Examples of these harmful sources include, but are not limited to, viruses, other software applications, employees (disgruntled or otherwise), hackers, and operating system errors.

For example, several governmental agencies have computer systems that require a high level of security with respect to access to the contents of confidential data, but these agencies do not have the technical expertise required to design, implement, and support all aspects of their complex computer systems. On the other hand, there are several companies that design, implement, and support computer systems and their operating systems, but they cannot be granted unrestricted access to these agencies' computer systems because of the highly sensitive nature of the data content housed therein.

One solution is for the agencies to encrypt their data so that, when accessed by such companies, the data content is incomprehensible. Encryption is employed in computer systems to limit readability of data files to those who know how to decrypt it (have the correct encryption algorithm). However, most data encryption is "file-based"—that is, while the contents of the file are hidden, specific information about the file is still unencrypted, including the file name, header information, metadata, and file characteristics (such as size, location, etc.), and thus the files remain vulnerable. Microsoft Corporation's Encrypting File System (EFS) is an example of a prior art system for encrypting files (see white paper, "Encrypting File System for Windows 2000", available on the Internet. What is needed is a way to improve data access security in computer systems to support high-security applications—specifically, sector-level data encryption. Also, there is an additional need for a means by which security can be added to a virtual machine without having to be written directly into the VM (or, more correctly, the VMM on behalf of the VM).

SUMMARY OF THE INVENTION

Several embodiments of the present invention provide a means for improving data access security in computer systems to support high-security applications, and certain of these embodiments are specifically directed to providing sector-level encryption of a virtual hard disk in a virtual machine environment.

Certain embodiments of the present invention are directed to a system for and method of providing sector-level encryption by using plug-ins in a virtual machine environment, thereby providing improved data access security in a computer system that supports high-security applications. Certain embodiments also use encryption plug-ins associated with standard encryption software for exchanging data between a virtual machine (VM) and its associated virtual hard drive(s) (VHDs). For some of these embodiments, the encryption functionality resides in the host OS and the applications, drivers, and so forth running on said host OS (altogether the "host environment"), which is external to the VM; thus, the VM need not have any knowledge as to whether encryption is occurring or of the nature of encryption, which may be any available encryption technique. Additionally, because a VHD is actually a physical file within the physical hard drive of the host OS, the present invention is essentially providing sector-level encryption and, thus, a high level of data security is achieved. Finally, several embodiments of the present invention are directed to the use of plug-in encryption services that interface with, and provide services for, a VM via a VM Encryption API (defined herein below).

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 5A is a flowchart illustrating a method of providing sector-level encryption in a virtual machine environment for several embodiments the present invention; and FIG. 5B is a flowchart illustrating a method of retrieving sector-level encrypted data for a virtual machine environment for several embodiments the present invention.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor(s) has (have) contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
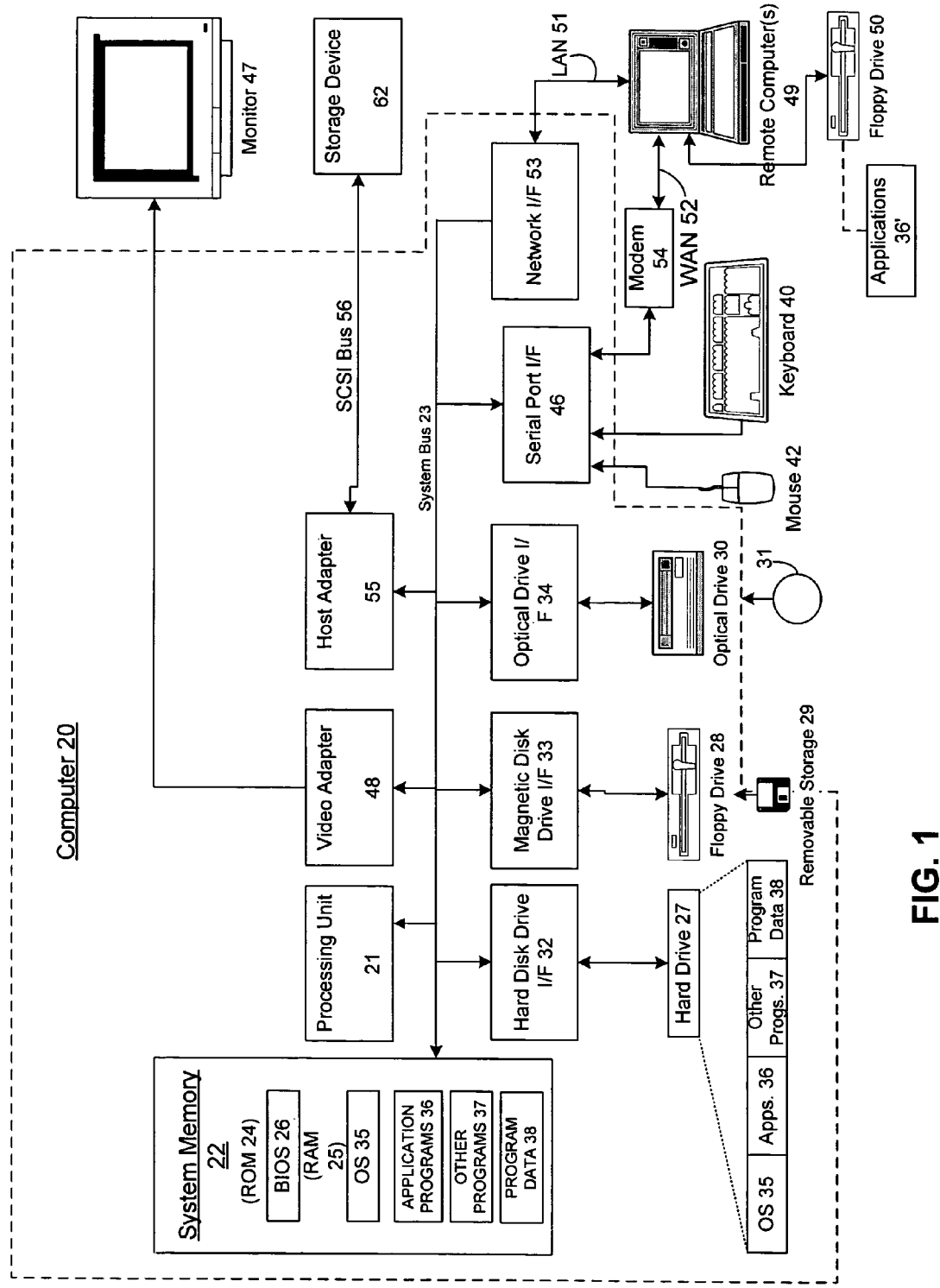
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a VM to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
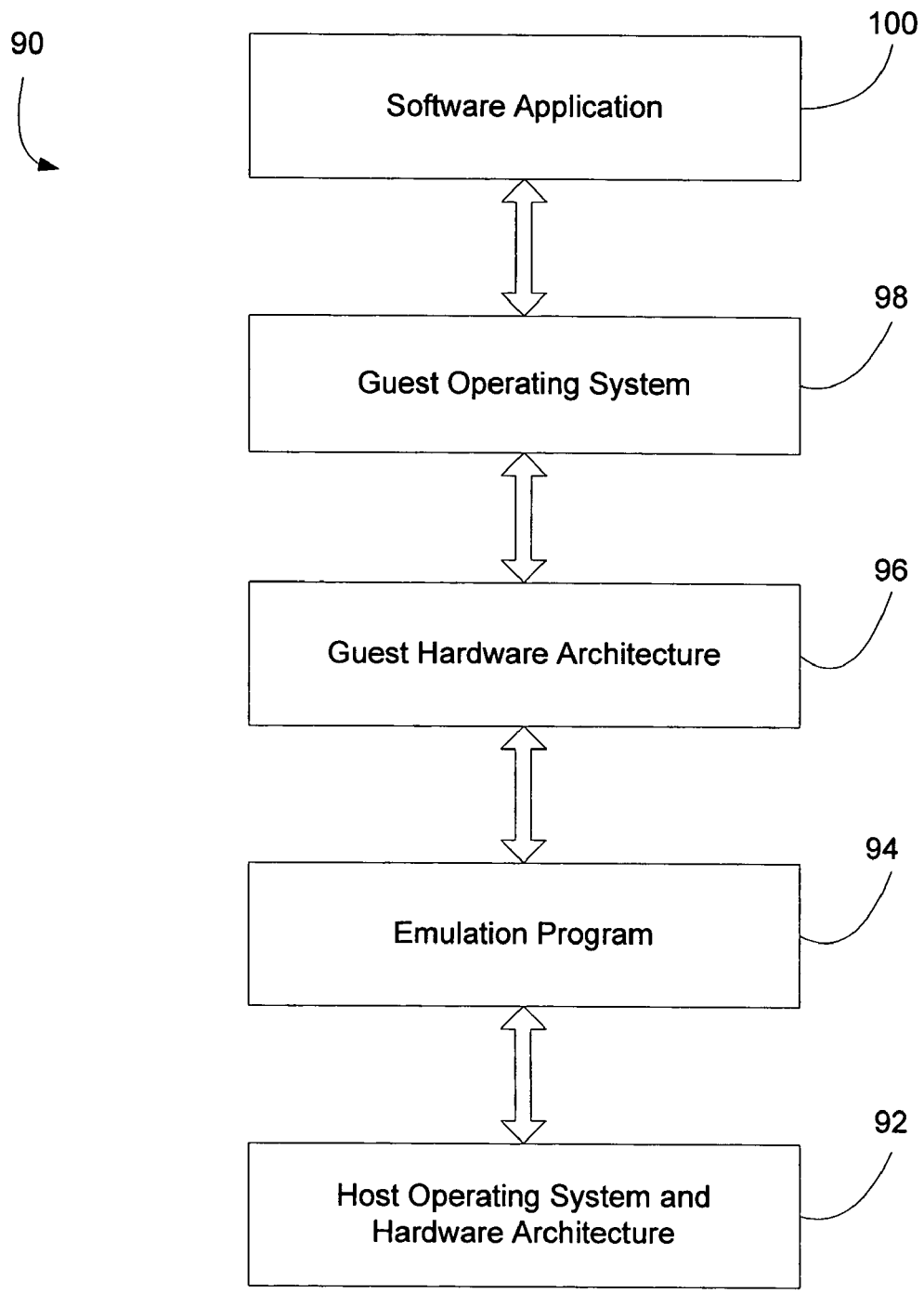
FIG. 2 is a block diagram representing the logical layering of the hardware and software architecture for an emulated operating environment in a computer system.

FIG. 2 is a diagram representing the logical layering of the hardware and software architecture for an emulated operating environment in a computer system. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

Figure 3A:
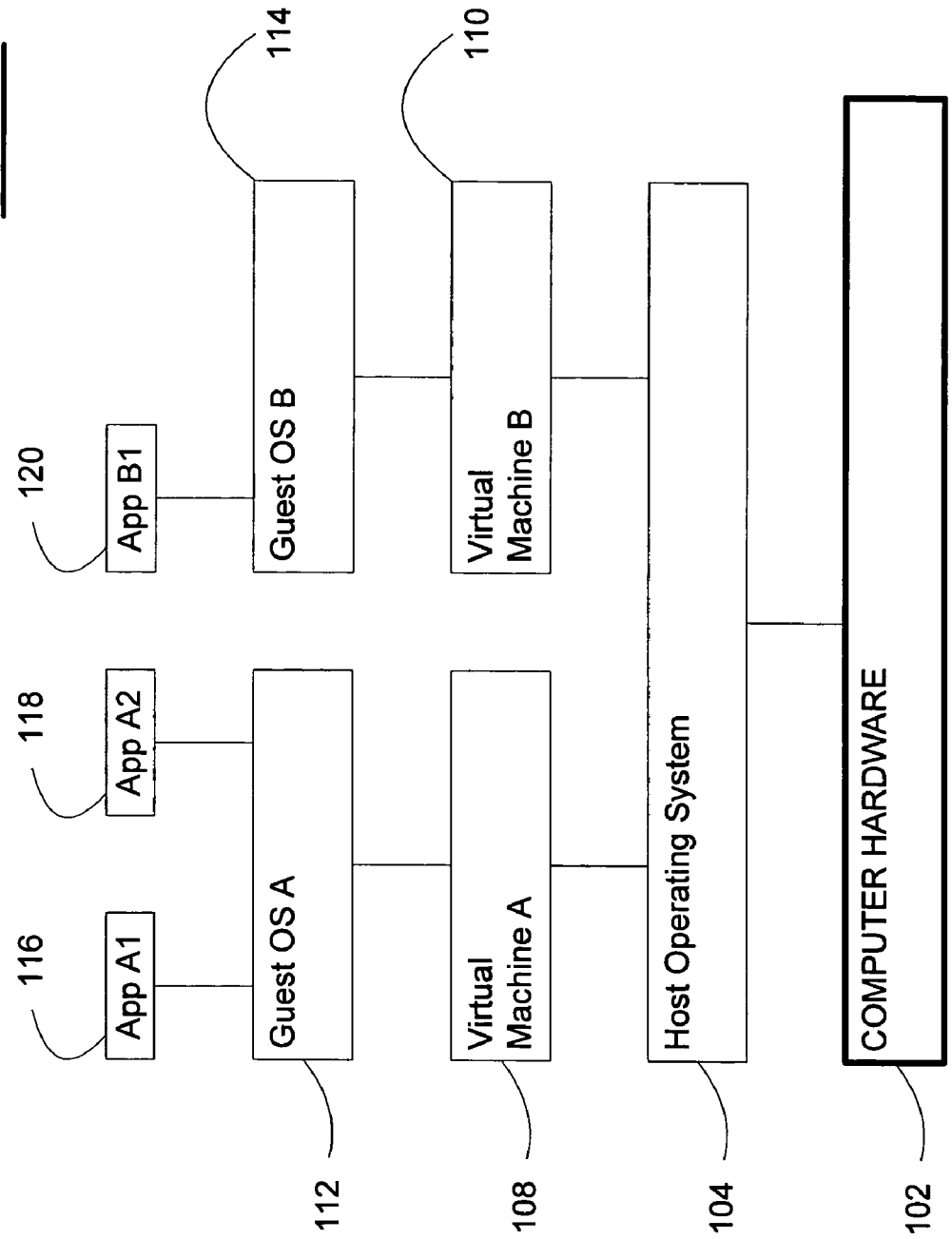
FIG. 3A is a block diagram representing a virtualized computing system.

FIG. 3A illustrates a virtualized computing system comprising a host operating system software layer 104 running directly above physical computer hardware 102, and the host operating system (host OS) 104 virtualizes all the resources of the machine by exposing interfaces that are the same as the hardware the host OS is virtualizing (which enables the host OS to go unnoticed by operating system layers running above it).

Figure 3B:
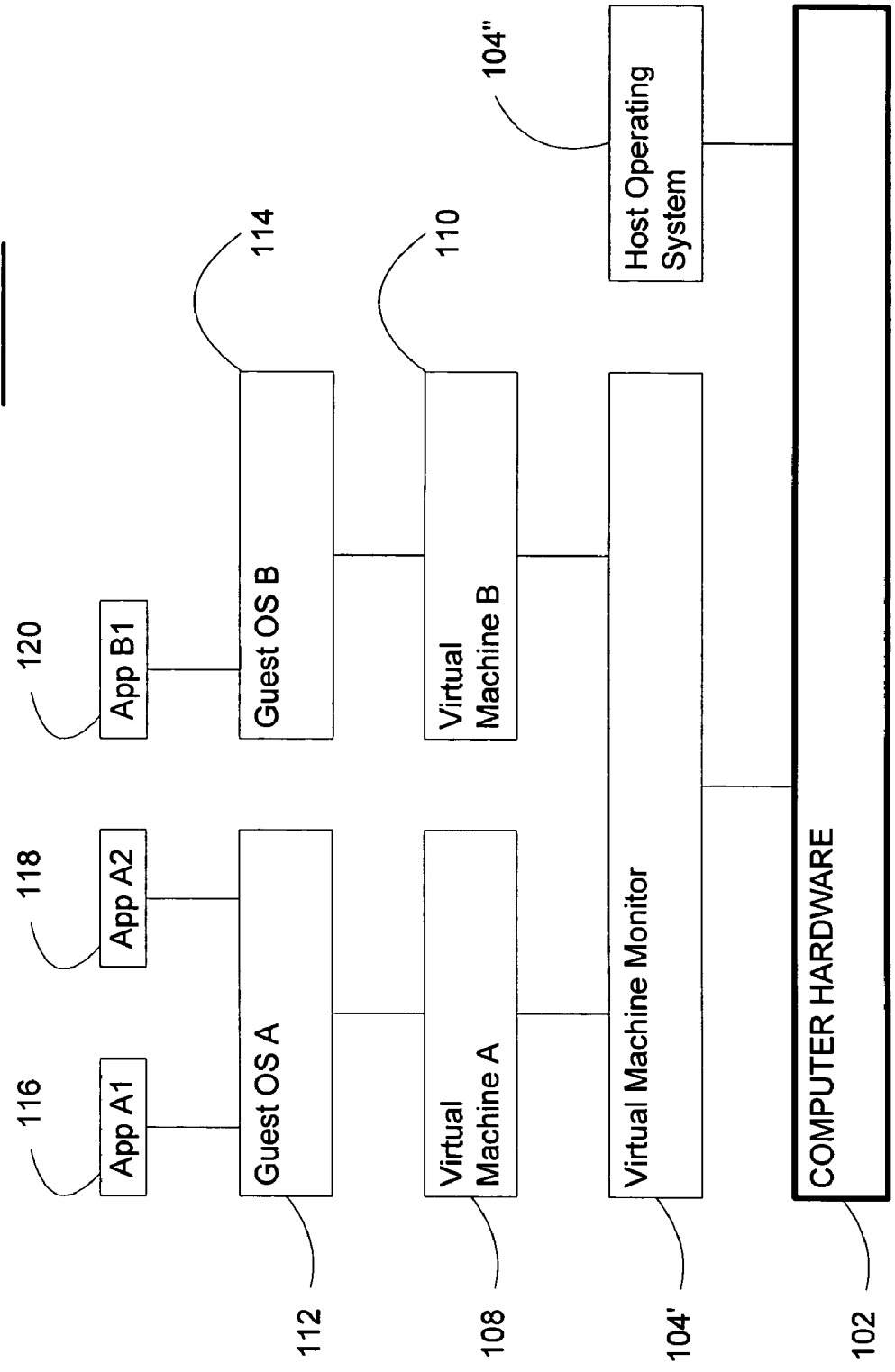
FIG. 3B is a block diagram representing an alternative embodiment of a virtualized computing system comprising a virtual machine monitor running alongside a host operating system.

Alternately, a virtual machine monitor, or VMM, software layer 104' may be running in place of or alongside a host operating system 104", the latter option being illustrated in FIG. 3B. For simplicity, all discussion hereinafter (specifically regarding the host operating system 104) shall be directed to the embodiment illustrated in FIG. 3A; however, every aspect of such discussion shall equally apply to the embodiment of FIG. 3B wherein the VMM 104' of FIG. 3B essentially replaces, on a functional level, the role of the host operating system 104 of FIG. 3A described herein below.

Referring again to FIG. 3A, above the host OS 104 (or VMM 104') are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSs) A 112 and B 114 respectively. Above guest OS A 112 are running two applications, application A1 116 and application A2 118, and above guest OS B 114 is Application B1 120.

VM Data Encryption

Figure 4A:
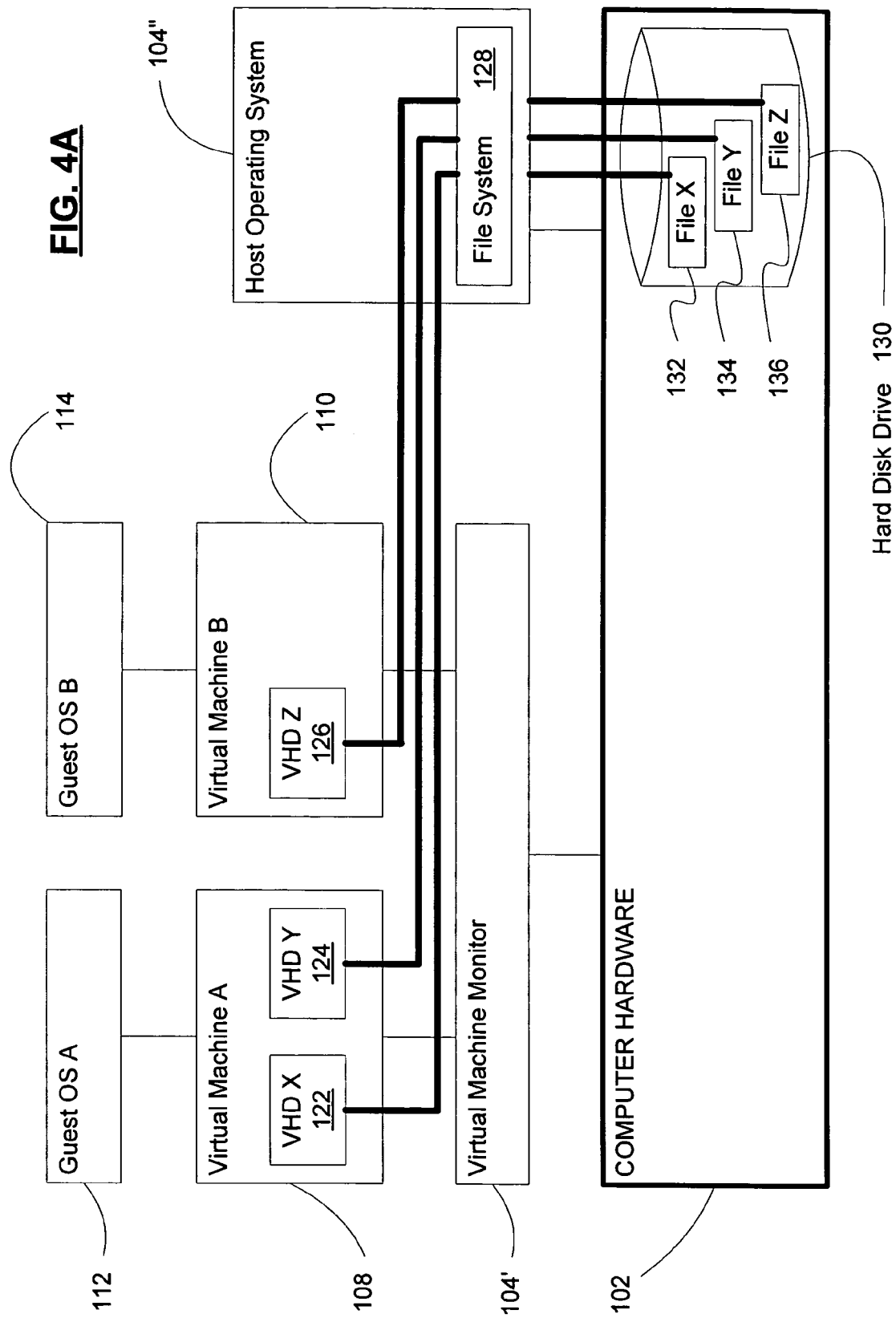
FIG. 4A is a block diagram representing portions of the system of FIG. 3B and further comprises a plurality of emulated devices, in this instance a plurality of virtual hard drives (VHDs)
Figure 4B:
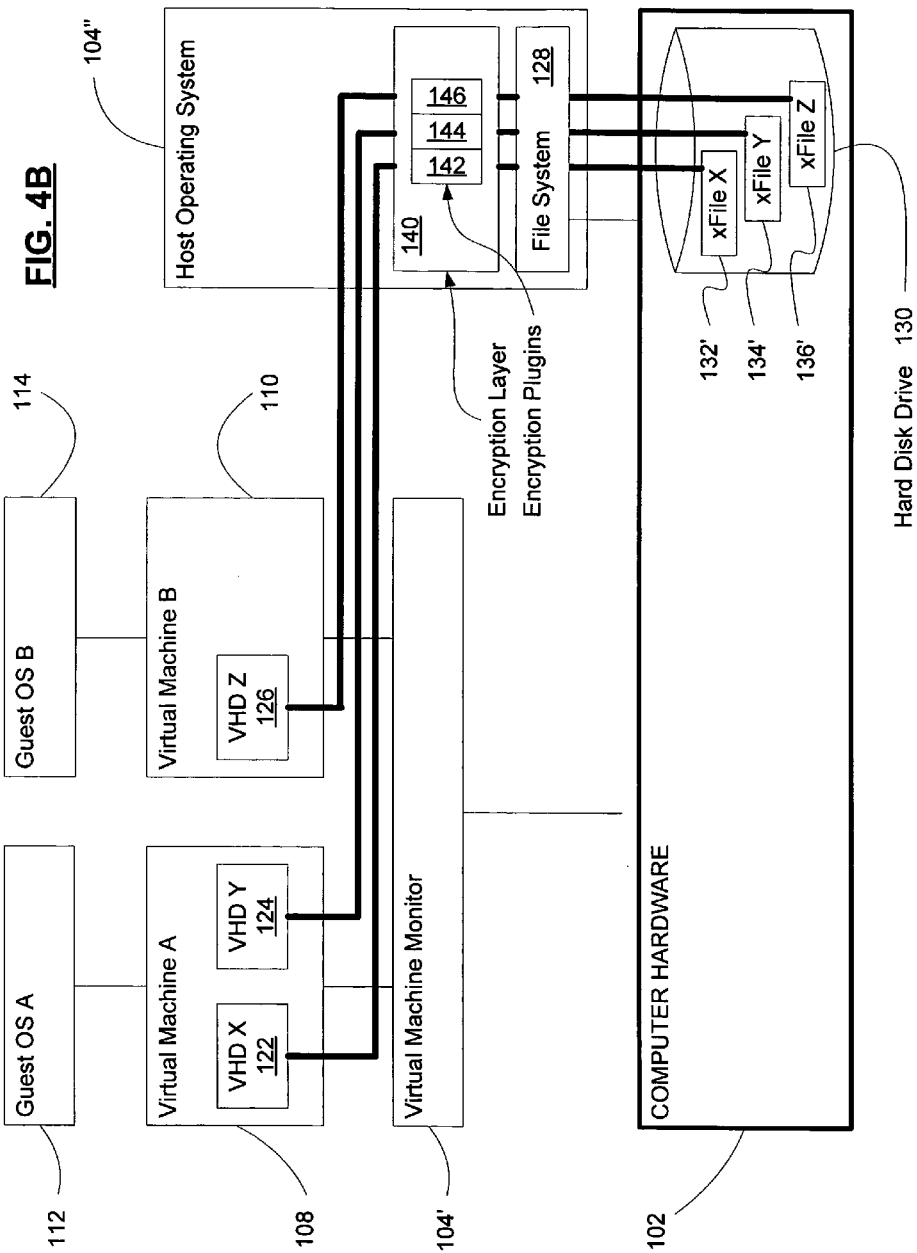
FIG. 4B is a block diagram representing the system of FIG. 4A further comprising an encryption layer and a plurality of encryption plug-ins that interact with the VMs via a VM Encryption API, and thus illustrates one implementation of several embodiments of the present invention.

FIGS. 4A and 4B illustrate portions of the system of FIG. 3B that further comprises a plurality of emulated devices, in this instance a plurality of virtual hard drives (VHDs). As known and understood by those of skill in the art, a VHD is a virtualized device, logically equivalent to a physical hard drive device, that a virtual machine emulates for a guest operating system. (As used herein, the terms "hard disk," "hard drive," and "hard disk drive" may be used interchangeably.) In FIG. 4A, VM A 108 comprises VHD X 122 and VHD Y 124 which, for example, the virtual machine may emulate for Guest OS A 112 as hard drive "C:" and hard drive "D:" (not shown). Likewise, VM B 110 comprises VHD Z 126 for Guest OS B 114 as hard drive "C:" (not shown) for that operating system.

In this embodiment, VHD 122 is implemented as a single data file, File X 132, on the physical hard disk 130 of the computer hardware 102; VHD 124 is also implemented as a single data file, File Y 134, on the same physical hard disk 130; and VHD 126 is also implemented as a single data file, File Z 136, on the physical hard disk 130 as well. Of course, as will be understood and readily appreciated by those of skill in the art, these VHD representations may be located in several files and across separate hard drives, separate computer systems, or they can be something other than a file (for example, a table in a database, a database, a block of active memory, etc., etc.). Moreover, although for the present embodiment all three VHDs are in fact files maintained by the file system 128 of the host OS 104", in alternative embodiments they may be implemented in other ways, such as files or other data structures maintained by the VMM 104'. Nevertheless, in the present embodiment, and as illustrated in the figure, the VHDs 122, 124, and 126 are implemented through the file system 128 of the host operating system 104" as files 132, 134, and 136 respectively on the physical hard drive 130 of the physical computer hardware 102.

FIG. 4B illustrates one embodiment of the present invention wherein plug-in encryption is used to protect the VHDs 122, 124, 126. In this figure, the host OS 104" further comprises an encryption layer 140 and a plurality of encryption plug-in modules 142, 144, and 146 which, operating somewhere above the file system, encrypt the VHDs 122, 124, and 126 respectively as encrypted data files (xfiles) 132', 134', and 136' respectively. The plug-ins interact with their corresponding VM via a VM Encryption Application Programming Interface (API) (not shown) whereby each VM Encryption API defines the means for a security plug-in to interact with the virtual machine as necessary to provide the encryption services for VM virtual devices such as VHDs, virtual networks, and so forth.

Generally a plug-in is a small application (somewhat akin to a device driver) that contains data that is used to alter, enhance, or extend the operation of a parent application program which, in this case, is the VMM that provides the VM abstraction. Plug-ins are often commercially and independently developed, come in different versions specific to particular operating systems, and interact with the application they are enhancing via an Application Programming Interface (API) exposed by that application.

In reference to FIG. 4B, the encryption plug-in 142, 144, and 146 are plug-ins for utilizing available encryption software that resides within host operating system 104", thereby providing data security for the VHDs 122, 124, and 126. Example suppliers of encryption software are VeriSign, Inc. (Mountain View, Calif.), PGP Corporation (Palo Alto, Calif.), RSA Security Inc. (Bedford, Mass.), Veridian Corporation (Arlington, Va.), or Certicom Corp. (Mississauga, ON). Furthermore, encryption algorithms used by the U.S. government exist, such as those used by the Central Intelligence Agency (CIA) or the National Security Agency (NSA). In several embodiments, one or more encryption software applications may be loaded within host operating system 104", therefore encryption plug-ins are specific to whatever encryption software application they are associated with. In certain embodiments, a flag within the headers of the files that represent each VHD 122, 124, and 126 indicate whether "encryption" is active, and the headers may also include an associated "encryptionID" or equivalent field which matches the type of encryption plug-in used (that is, which specific encryption technique is applied) and thereby act as a pointer to the required encryption plug-in and encryption software application that resides on host operating system 104".

In one embodiment of the present invention, each VM (or, more correctly, the VMM on behalf of the VM) maintains a unique identifier for identifying the correct encryption layer plug-in for each of its VHDs. In an alternative embodiment, the encrypted data file maintains in its header information a unique identifier corresponding to the correct encryption layer plug-in. The encryption plug-ins only provide encryption services to those VMs and VHDs for which it is slated to do so using any of various methods known and appreciated by those of skill in the art.

The virtual machine encryption method suggested by the system illustrated in FIG. 4B provides isolation and security between guest OS A 112 and host operating system 104" at the physical hard drive level, thereby providing high-security VHD data that is not understandable by the host operating system 104". Furthermore, the virtual machine encryption method suggested by FIG. 4B allows multiple VHDs to be encrypted independently with any of several available encryption methods. Moreover, the invention provides an entirely transparent encryption technique for both an operating system running on a VM—e.g., Guest OS A 112 running on VM A 108, wherein Guest OS A 112 is without knowledge as to whether encryption is occurring—and the host OS 104" because, aside from the encryption services available to the VM via the plugins, the file system 128 treats the VHD encrypted files 132', 134' and 136' as any other file.

The encryption system and method described in FIG. 4B regarding VM A 108 and guest OS A 112 are exemplary and equally applicable to VM B 110 and guest OS B 114 or any other VM and guest OS. Lastly, the encryption system and method described in FIG. 4B is not limited to a standalone computer system; it may also be generally applied to a virtual network system.

FIG. 5A is a flowchart illustrating a method 150 of providing sector-level encryption in a virtual machine environment for several embodiments the present invention. At step 152, the method first comprises the introduction of an encryption plug-in somewhere into the computer system accessible and useable by a VM (or, more correctly, by the VMM on behalf of the VM)—for example, in an encryption layer of the host operating system. At step 154, this plug-in then interfaces with the VM via the VM's Security API. At step 156, the VM, using the plug-in, then encrypts the contents of a VHD and stores this VHD as a single file (or, alternately, as a plurality of files unrelated to the structure of the virtual data files in the virtual machine) on a physical storage medium such as a hard disk. Other methods that employ these basic steps are envisioned for various alternative embodiments of the present invention.

FIG. 5B is a flowchart illustrating a method 160 of retrieving sector-level encrypted data for a virtual machine environment for several embodiments the present invention. At step 162, the method first comprises the identification of the correct encryption plug-in somewhere into the computer system accessible and useable by a VM—for example, in an encryption layer of the host operating system—corresponding to a specific VHD. At step 164, the VM, using the plug-in, then decrypts the contents of a VHD, the latter existing as a single file (or, alternately, as a plurality of files unrelated to the structure of the virtual data files in the virtual machine) on a physical storage medium such as a hard disk. Other methods that employ these basic steps are envisioned for various alternative embodiments of the present invention.

In addition to the foregoing, a virtual machine (and, more specifically, a virtual hard disk) can also be utilized by a host operating system to provide virtual sector-level data encryption on a physical hard disk (a "software solution") in lieu of the utilization of specialized hardware otherwise necessary for achieving sector-level encryption (a "hardware solution"). In other words, as known and appreciated by those of skill in the art, a host OS alone can only achieve file-level encryption—that is, it can encrypt (and thereby hide) the data in a file that is stored to a hard disk, but it cannot encrypt the file's name, header information, metadata, and file characteristics (such as size, starting location, etc.). To achieve sector-level encryption (where file data as well as the file's name, header information, metadata, and file characteristics), specialized hardware is typically used to encrypt the data before it is written to the physical disk drive (the hardware solution). However, a host OS directly or indirectly using a virtual hard drive, either within a VM or simply as an emulated device in the host operating system, could encrypt the entire contents of that VHD into a single file (XXX) and, thus, the utilization of a VHD in this manner provides a software solution for sector-level file encryption of data. This approach is further enhanced with the use of plug-in encryption for the reasons set forth elsewhere herein regarding the benefits of plug-in encryption.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A method executed by a computer system, the method comprising:

executing, by a host operating system running on the computer system, an encryption program, a virtual machine monitor, an encryption plug-in, and a file system, wherein the encryption plug-in is configured to interface with the encryption program;

interfacing, via an encryption-application program interface, the virtual machine monitor with the encryption plug-in, wherein the encryption plug-in enables the virtual machine monitor to interface with the encryption program;

executing, by the computer system, a virtual machine, the virtual machine including a virtual hard drive, wherein the virtual machine monitor is configured to store the virtual hard drive within a file in the file system;

providing sector-level encryption by encrypting, by the virtual machine monitor using the encryption program, the file including the virtual hard drive; and storing, by the host operating system, the file in the file system.

2. The method of claim 1, further comprising:

executing, by the virtual machine, a guest operating system, the guest operating system including a guest file system.

3. The method of claim 2, wherein encrypting the file includes encrypting metadata associated with the guest file system.

4. The method of claim 1, further comprising:

interfacing, via the encryption-application program interface, the virtual machine monitor with a second encryption plug-in, wherein the second encryption plug-in enables the virtual machine monitor to interface with a second encryption program, wherein the second encryption program implements a different encryption technique than an encryption technique implemented by the encryption program.

5. The method of claim 4, further comprising:

executing a second virtual machine, the second virtual machine including a second virtual hard drive, wherein the virtual machine monitor is configured to store the second virtual hard drive within a second file;

encrypting, by the second virtual machine monitor using the second encryption program via the second plug-in, the second file including the second virtual hard drive; and storing, by the host operating system, the second file in the file system.

6. The method of claim 1, further comprising:

reading metadata in the file, the metadata indicating that the encryption program was used to encrypt the file;

selecting the encryption program from a group of different encryption programs;

decrypting, by the virtual machine monitor using the encryption program, the file including the virtual hard drive; and executing, by the virtual machine, a guest operating system, the guest operating system stored in the virtual hard drive.

7. The method of claim 1, wherein the file includes a plurality of files.

8. A computer system, comprising:

a processor;

a hard drive;

a computer readable storage medium operatively coupled to the processor and the hard drive, the computer readable storage medium including instructions that upon execution by the processor cause the computer system to:

execute a host operating system, wherein the host operating system is configured to execute a virtual machine monitor, a plurality of encryption programs, a plurality of encryption plug-ins, and a host file system, wherein the virtual machine monitor includes an encryption-application program interface, wherein the encryption plug-ins are configured to interface the virtual machine monitor with the plurality of encryption programs via the encryption-application program interface;

execute the virtual machine monitor, the virtual machine monitor configured to execute a virtual machine including a virtual hard drive, the virtual machine configured to execute a guest operating system, the guest operating system including a guest file system that includes metadata;

wherein the virtual machine monitor is configured to interface with a first encryption plug-in selected from the plurality of encryption plug-ins;

wherein the virtual machine monitor is configured to encrypt, using the first encryption program, a file including the virtual hard drive thereby encrypting the guest file system and the guest file system metadata;

wherein the host operating system is configured to store, on the hard drive, the file in the host file system;

wherein the virtual machine monitor is configured to determine that the first encryption program was used to encrypt the file; and wherein the virtual machine monitor is configured to decrypt using the first encryption program, the file.

9. The computer system of claim 8, wherein the file includes a plurality of files.

10. The computer system of claim 8, wherein the file includes information that identifies the first encryption program was used to encrypt the file.

11. The computer system of claim 8, wherein the computer readable storage medium further comprises instructions that upon execution cause the computer system to:

encrypt, by the host operating system, the host file system.

12. The computer system of claim 8, wherein the computer readable storage medium further comprises instructions that upon execution cause the computer system to:

encrypt file names, header information, metadata, and file characteristics associated with the guest file system.

13. A computer system, comprising:

a processor;

a hard drive;

a computer readable storage medium operatively coupled to the processor and the hard drive, the computer readable storage medium including instructions that upon execution by the processor cause the computer system to:

run a host operating system including a virtual machine monitor, an encryption program, and an encryption plug-in, wherein the encryption plug-in is configured to interface with the encryption program;

interface, via an encryption-application program interface, the virtual machine monitor with the encryption plug-in thereby interfacing the virtual machine monitor with the encryption program;

execute a virtual machine that includes a virtual hard drive;

encrypt, by the virtual machine using the encryption program, a file including the virtual hard drive thereby providing sector-level encryption for virtual hard drive; and store the encrypted file on the hard drive.

14. The computer system of claim 13, wherein the computer readable storage medium further comprises instructions that upon execution by the processor cause the computer system to:

execute, by the virtual machine, a guest operating system that includes a guest file system.

15. The computer system of claim 14, wherein the instructions that upon execution by the processor cause the computer system to encrypt the file further comprise instructions that upon execution by the processor cause the computer system to:

encrypt the file thereby encrypting file names associated with the guest file system.

16. The computer system of claim 14, wherein the instructions that upon execution by the processor cause the computer system to encrypt the file further comprise instructions that upon execution by the processor cause the computer system to:

encrypt the file thereby encrypting header information associated with the guest file system.

17. The computer system of claim 14, wherein the instructions that upon execution by the processor cause the computer system to encrypt the file further comprise instructions that upon execution by the processor cause the computer system to:

encrypt the file thereby encrypting metadata associated with the guest file system.

18. The computer system of claim 14, wherein the instructions that upon execution by the processor cause the computer system to encrypt the file further comprise instructions that upon execution by the processor cause the computer system to:

encrypt the file thereby encrypting file system characteristics associated with the guest file system.

19. A memory device including processor executable instructions, the memory device comprising instructions that upon execution by a processor cause the processor to:

host, by a virtual machine monitor, a first partition and a second partition, wherein the first partition includes a virtual machine, the virtual machine including a virtual hard drive;

execute an encryption program in a second partition;

interface the virtual machine monitor to an encryption plug-in via an encryption-application program interface, wherein the encryption plug-in is configured to interface the virtual machine monitor with the encryption program;

encrypt, by the virtual machine using the encryption program, a file including the virtual hard drive thereby providing sector-level encryption for the virtual hard drive; and store the encrypted file on a hard drive.

20. The memory device of claim 19, wherein the second partition includes a host operating system, the host operating system including a host file system.

21. The memory device of claim 20, wherein the file is stored in the host file system.

22. The memory device of claim 21, further comprising instructions that upon execution by the processor cause the processor to:

encrypt, by the host operating system, the host file system.

* * * * *